United States Patent
Aso et al.

(10) Patent No.: US 8,085,409 B2
(45) Date of Patent: Dec. 27, 2011

(54) SURFACE PROFILE MEASURING APPARATUS

(75) Inventors: Kohei Aso, Sakai (JP); Yosuke Takebe, Sakai (JP); Jun Matsumoto, Yokohama (JP)

(73) Assignee: Konica Minolta Sensing, Inc., Osaka (JP)

( * ) Notice: Subject to any disclaimer, the term of this patent is extended or adjusted under 35 U.S.C. 154(b) by 343 days.

(21) Appl. No.: 12/231,057

(22) Filed: Aug. 28, 2008

(65) Prior Publication Data

US 2009/0070068 A1    Mar. 12, 2009

(30) Foreign Application Priority Data

Aug. 31, 2007    (JP) .................... 2007-225643

(51) Int. Cl.
*G01B 11/24*    (2006.01)
*G01B 11/30*    (2006.01)
(52) U.S. Cl. ........................ 356/601; 356/600
(58) Field of Classification Search .............. None
See application file for complete search history.

(56) References Cited

U.S. PATENT DOCUMENTS

| | | | | |
|---|---|---|---|---|
| 3,749,496 A * | 7/1973 | Hietanen et al. | ............... | 356/73 |
| 3,761,179 A * | 9/1973 | Plummer et al. | ............. | 356/601 |
| 4,957,367 A * | 9/1990 | Dulman | ........................ | 356/512 |
| 5,120,978 A * | 6/1992 | Yamashita et al. | ............ | 356/339 |
| 5,270,794 A * | 12/1993 | Tsuji et al. | .................... | 356/600 |
| 5,859,424 A * | 1/1999 | Norton et al. | ................. | 250/226 |
| 6,750,968 B2 * | 6/2004 | Sandusky | ...................... | 356/369 |
| 6,975,404 B2 * | 12/2005 | Schwarz | ...................... | 356/446 |
| 6,987,568 B2 * | 1/2006 | Dana | ............................ | 356/446 |
| 7,145,654 B2 * | 12/2006 | Norton | ......................... | 356/369 |
| 7,616,319 B1 * | 11/2009 | Woollam et al. | ............. | 356/451 |
| 7,813,581 B1 * | 10/2010 | Fitzpatrick et al. | .......... | 382/260 |
| 2003/0137659 A1 * | 7/2003 | Milshtein | .................. | 356/237.2 |
| 2003/0156266 A1 * | 8/2003 | Tanitsu | ........................ | 355/67 |

FOREIGN PATENT DOCUMENTS

JP    08-128951    5/1996

OTHER PUBLICATIONS

Figs. 8, 9A, 9B, 10A, 10B, 11A and 11B of present application filed Aug. 28, 2008 entitled "Surface Profile Measuring Apparatus,".

* cited by examiner

*Primary Examiner* — Gregory J Toatley
*Assistant Examiner* — Juan D Valentin
(74) *Attorney, Agent, or Firm* — Brinks Hofer Gilson & Lione

(57) ABSTRACT

A surface profile measuring apparatus of the invention has a changing section for changing the cross section of a flux of light to be projected onto a sample by a light projecting section in measuring a surface profile of the sample. The surface profile measuring apparatus having the above arrangement enables to measure the surface profile of the sample easily and precisely, without using different kinds of measuring apparatuses.

15 Claims, 11 Drawing Sheets

SURFACE PROFILE MEASURING APPARATUS

This application is based on Japanese Patent Application No. 2007-225643 filed on Aug. 31, 2007, the contents of which are hereby incorporated by reference.

BACKGROUND OF THE INVENTION

1. Field of the Invention

The present invention relates to a surface profile measuring apparatus for measuring a surface profile of a sample, and more particularly to a surface profile measuring apparatus for illuminating a sample surface and measuring a surface profile of the sample based on reflection light from the sample surface.

2. Description of the Related Art

A surface glossiness is an important factor of the external appearance of an object, and is measured with respect to different kinds of products. The surface glossiness measuring method is standardized. As an example of the standardized method, FIG. 8 shows an arrangement of a surface profile measuring apparatus or a glossiness meter for measuring a surface glossiness at an incident angle of 60 degrees in accordance with ASTM D523. Referring to FIG. 8, a light flux from a light source 903, which has passed through an illumination aperture 902 having a rectangular opening in an aperture plate 901, is irradiated onto a sample surface 906 through an illumination lens 904, as a parallel light flux 905. Then, a specular reflection component 907 of light reflected on the sample surface 906 is converged on a light receiving lens 908, and the converged light is received on a light receiving device 911 through a light receiving aperture 910 having a rectangular opening in an aperture plate 909.

An optical axis 912 of an illumination system, and an optical axis 913 of a light receiving system are respectively tilted at 60° with respect to a normal 914 to the sample surface 906. The width (w) of the illumination aperture 902 in x-direction parallel to the plane direction of FIG. 8, and the height (h) of the illumination aperture 902 in y-direction orthogonal to the plane direction are respectively e.g. w=0.75 degrees and h=2.5 degrees in terms of angle of view. Similarly, the width (W) and the height (H) of the light receiving aperture 910 are respectively e.g. W=4.4 degrees and H=11.7 degrees in terms of angle of view. In the case where the sample surface 906 is a mirror surface, an image 902' of the illumination aperture 902 is formed in the light receiving aperture 910, and the entirety of the reflection light from the sample surface 906 i.e. the specular reflection light component 907 is received on the light receiving device 911. However, as the glossiness of the sample surface 906 is lowered, the image 902' is expanded. When the image 902' is larger than the light receiving aperture 910, the light amount of light passing through the light receiving aperture 910, i.e. the light receiving amount of the light receiving device 911 is reduced. As described above, there is a relation between the glossiness and the light receiving amount. The surface profile measuring apparatus measures a glossiness value by utilizing the above relation i.e. correlating a light receiving amount to a glossiness value, and based on a difference in the light receiving amount. The measurement is performed based on the premise that the sample surface is flat. Accordingly, in the case where a curved surface of a sample is measured, a variation in measurement value may be increased, as compared with a case that a flat surface is measured. Japanese Unexamined Patent Publication No. Hei 8-128951 discloses an example of the above conventional art.

FIG. 9A is a diagram showing a condition that the cross section (S) of a projection light flux i.e. an incident light flux or the cross sectional size of a light flux with respect to a curved surface of a sample is relatively large in measuring the curved surface. Alternatively, the illumination area (P) of a portion where a projection light flux is projected may be used, in place of the cross section (S) of a projection light flux. In the case where the portion is illuminated with a circular light flux, the illumination area (P) corresponds to an illumination diameter. In this arrangement, outer light of the light flux 905 is reflected in a direction away from the light receiving aperture 910 i.e. the optical axis 913. Accordingly, it is difficult or impossible to accurately receive specular reflection light on the light receiving lens 908, thereby reducing the light receiving component. As a result, a variation in measurement value may be generated between a condition that a flat surface is measured, and a condition that a curved surface is measured. In other words, it is impossible to distinguish whether the decrease in the light receiving component is due to a variation in measurement value, or lowering of the glossiness. In view of this, there is proposed an arrangement, as shown in FIG. 9B, in which the cross section (S) of a projection light flux i.e. an incident light flux, or the illumination area (P) is reduced. In the arrangement shown in FIG. 9B, outer light i.e. reflection light of the light flux 905 is sufficiently close to the light receiving aperture 910. Accordingly, almost the entirety of the specular reflection light is trapped by the light receiving lens 908, and a variation in measurement value is significantly small between a condition that a flat surface is measured, and a condition that a curved surface is measured. In other words, reducing the cross section (S) of a projection light flux in measuring a curved surface enables to receive the light, even if the light receiving component may spread to some extent. This is advantageous in reducing a variation in measurement value.

In the case where the sample surface is a fine roughness surface i.e. an uneven surface, if the cross section (S) of a projection light flux is large, an averaging effect effectively works, and it is less likely that a variation in measurement value depending on the measuring position may be generated. Specifically, assuming that the reference numeral 921 in FIGS. 10A and 10B indicates a fine roughness surface, even if the position of projecting a projection light flux onto the fine roughness surface 921 i.e. the measuring position is displaced between a condition as shown in FIG. 10A and a condition as shown in FIG. 10B, the area of each white portion and the area of each black portion of the fine roughness surface 921 are identical in the range of the illumination area (P1), as far as the cross section (S) of a projection light flux is large. In FIGS. 10A and 10B, the area corresponding to two white portions and the area corresponding two black portions are identical. It should be noted that the fine roughness surface 921 conceptually represents an uneven surface. The white portions and the black portions in FIGS. 10A and 10B indicate small areas on the fine roughness surface 921, in other words, fine roughness or fine asperities. In other words, since the averaging effect works, and substantially identical reflection light is obtained between the condition as shown in FIG. 10A and the condition as shown in FIG. 10B, it is less likely that a variation in measurement value may be generated.

On the other hand, in the case where the cross section (S) of a projection light flux is reduced, a variation in measurement value may be increased. Specifically, in the case where the position of projecting a projection light flux onto the fine roughness surface 921 i.e. the measuring position is displaced between a condition as shown in FIG. 11A and a condition as shown in FIG. 11B, the area of a white portion in FIG. 11A and the area of a black portion in FIG. 11B on the fine roughness surface 921 may be different from each other in the range of the illumination area (P2), if the cross section (S) of a projection light flux is small. In other words, the averaging effect does not work, and a variation in measurement value may be increased, because reflection light is different between the condition as shown in FIG. 11A and the condition as shown in FIG. 11B.

In other words, in the case where the cross section i.e. the illumination diameter of a projection light flux is large, an error in measuring a curved surface may be increased, or measuring a small site or a small area may be difficult or impossible. On the other hand, in the case where the cross section of a projection light flux is small, a variation in measurement value may be generated even by a slight displacement in the measuring position, if the sample to be measured has an uneven surface such as a fine roughness surface. In view of this, it is necessary to use different kinds of measuring apparatuses with respect to each sample to be measured; or measure the sample a multiple number of times while changing the measuring position, and perform an averaging process with respect to the measurement values; or perform measurement while allowing a measurement error.

SUMMARY OF THE INVENTION

In view of the above conventional examples, it is an object of the present invention to provide a surface profile measuring apparatus that enables to easily and precisely measure a surface profile such as a curved surface or a small area of a sample in a short time, without using different kinds of measurement apparatuses i.e. with use of a single apparatus.

A surface profile measuring apparatus according to an aspect of the invention has a changing section for changing the cross section of a flux of light to be projected onto a sample by a light projecting section in measuring a surface profile of the sample. The surface profile measuring apparatus having the above arrangement enables to measure the surface profile of the sample easily and precisely, without using different kinds of measuring apparatuses.

These and other objects, features and advantages of the present invention will become more apparent upon reading the following detailed description along with the accompanying drawings.

BRIEF DESCRIPTION OF THE DRAWINGS

FIGS. 2A and 2B are enlarged views for describing an operation of switching an aperture by an aperture switching plate, wherein FIG. 2A shows a condition that a large aperture is defined, and FIG. 2B shows a condition that a small aperture is defined.

FIGS. 4A and 4B are diagrams for describing a modification of the aperture switching operation, wherein FIG. 4A shows a condition that a large aperture is defined, and FIG. 4B shows a condition that a small aperture is defined.

FIGS. 5A and 5B are diagrams for describing a modification of the surface profile measuring apparatus concerning changing a projection light sectional area, wherein FIG. 5A shows a condition that a large projection light sectional area is defined, and FIG. 5B shows a condition that a small projection light sectional area is defined.

FIGS. 6A and 6B are diagrams for describing another modification of the surface profile measuring apparatus concerning changing the projection light sectional area, wherein FIG. 6A shows a condition that a large projection light sectional area is defined, and FIG. 6B shows a condition that a small projection light sectional area is defined.

FIGS. 7A and 7B are diagrams for describing a modification of the aperture switching operation, wherein FIG. 7A shows a condition that a large projection light sectional area is defined, and FIG. 7B shows a condition that a small projection light sectional area is defined.

FIGS. 9A and 9B are diagrams for describing a measuring method to be performed by the conventional surface profile measuring apparatus, wherein FIG. 9A shows a condition that a large projection light sectional area is defined, and FIG. 9B shows a condition that a small projection light sectional area is defined.

FIGS. 10A and 10B are diagrams for describing a measuring method to be performed by the conventional surface profile measuring apparatus, wherein FIG. 10A shows a condition that light is irradiated to a certain position on a fine roughness surface, in the case where a large projection light sectional area is defined, and FIG. 10B shows a condition that light is irradiated to a position other than the position shown in FIG. 10A on the fine roughness surface, in the case where a large projection light sectional area is defined.

FIGS. 11A and 11B are diagrams for describing a measuring method to be performed by the conventional surface profile measuring apparatus, wherein FIG. 11A shows a condition that light is irradiated to a certain position on a fine roughness surface, in the case where a small projection light sectional area is defined, and FIG. 11B shows a condition that light is irradiated to a position other than the position shown in FIG. 11A on the fine roughness surface, in the case where a small projection light sectional area is defined.

DETAILED DESCRIPTION OF THE PREFERRED EMBODIMENTS OF THE INVENTION

Figure 1:
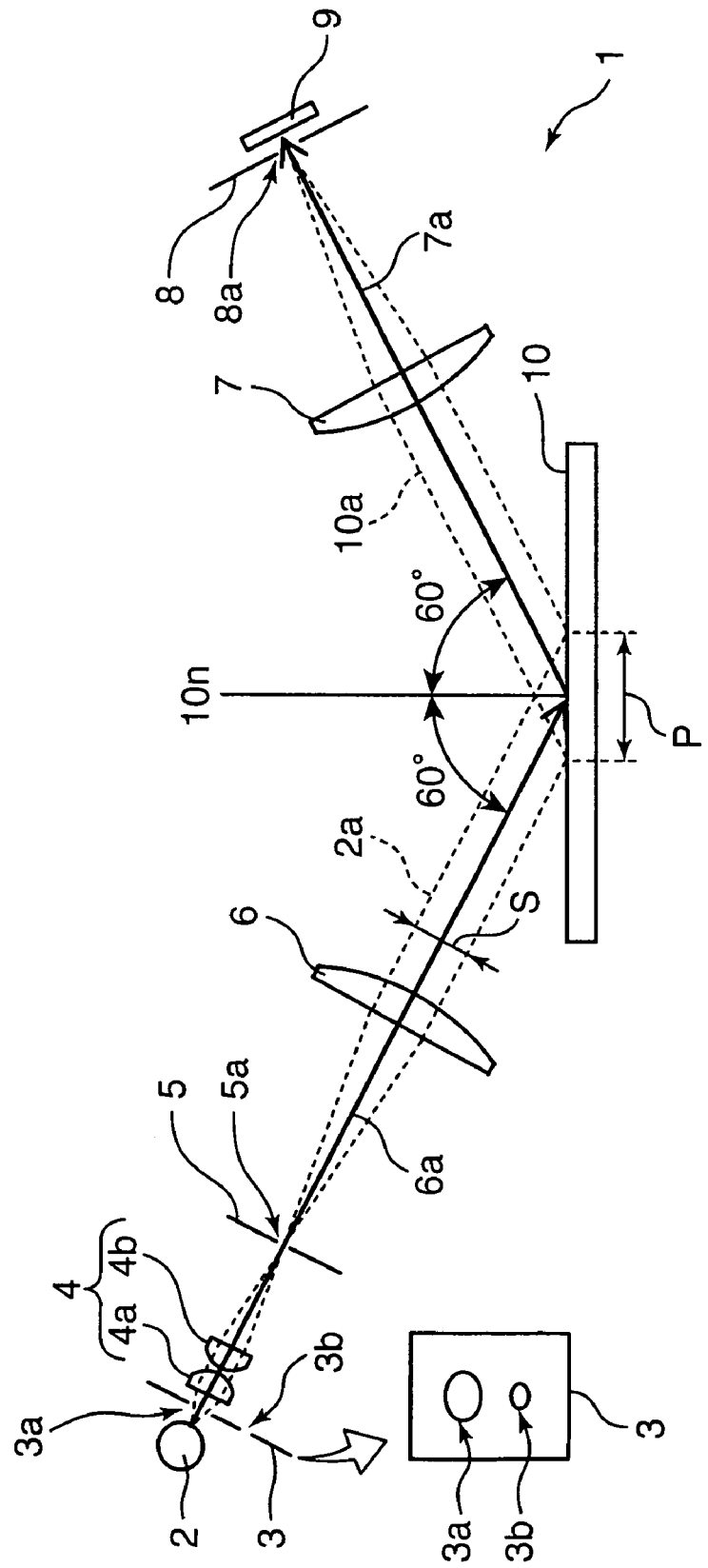
FIG. 1 is a diagram showing an example of a surface profile measuring apparatus embodying the invention.

FIG. 1 is a diagram showing an example of a surface profile measuring apparatus embodying the invention. Referring to FIG. 1, the surface profile measuring apparatus 1 is adapted to measure a glossiness of a sample surface 10 of a sample as an object to be measured; and includes a light source 2, an aperture switching plate 3, a relay lens unit 4, a first aperture plate 5, an illumination lens 6, a light receiving lens 7, a second aperture plate 8, and a light receiving device 9. In this embodiment, the surface profile measuring apparatus 1 measures a glossiness of a sample surface at an incident angle of 60 degrees in accordance with ASTM D523. The light source 2 emits illumination light to be projected onto the sample surface 10, and is constituted of a light emitting diode, a laser light source, a halogen electric bulb, or the like. Among the above elements, the light emitting diode is preferable in the aspect of maintenance, electric power consumption, or a like advantage.

The illumination lens 6 is an illumination optical system i.e. a collimator lens for converting an emission light flux emitted from the light source 2 through the relay lens unit 4 into a parallel light flux 2a to illuminate the sample surface 10 with the parallel light flux 2a. The illumination lens 6 may be constituted of multiple lens elements, in place of a single lens element. The light receiving lens 7 is a light receiving optical system i.e. a collimator lens for receiving reflection light i.e. a light flux 10a reflected on the sample surface 10 to guide the received light flux 10a to the light receiving device 9 i.e. condense the received light flux 10a on the light receiving device 9. The reference numeral 7a indicates an optical axis of the light receiving lens 7. Similarly to the illumination lens 6, the light receiving lens 7 may be constituted of multiple lens elements. The light receiving device 9 is a light receiving sensor i.e. a light receiving array for receiving reflection light from the sample surface 10, is constituted of one or more pixels as light receiving elements, and outputs a pixel signal in accordance with an intensity of incident light onto the corresponding light receiving element.

The relay lens unit 4 is a lens unit for transmitting a light image i.e. transmitting an image (including a real image and a virtual image) of an enlarged size or an actual size from a certain point to another point in the optical system. The relay lens unit 4 is constituted of e.g. a pair of flat convex lenses 4a and 4b having convex surfaces thereof opposed to each other. The light from the light source 2 is converted into a parallel light flux by the flat convex lens 4a, and the parallel light flux is condensed on an aperture 5a of the first aperture plate 5, which is described later, through the flat convex lens 4b.

The first aperture plate 5 is a member having the aperture 5a of a predetermined size. The first aperture plate 5 is an angle defining aperture for defining i.e. limiting an angle of the parallel light flux 2a by the aperture area of the aperture 5a. In this embodiment, the aperture 5a has a rectangular shape. The first aperture plate 5 is arranged at such a position that the aperture 5a is aligned with a focus position i.e. an image forming position of the illumination lens 6. The predetermined size corresponds to a predetermined aperture area. In this embodiment, the aperture has a rectangular shape. Alternatively, the aperture 5a may have e.g. a circular shape including an elliptical shape. In the case where the aperture 5a has a circular shape, the aperture 5a may have a predetermined aperture diameter, in place of the predetermined size. The same definition is also applied to aperture members of the second aperture plate 8 and the aperture switching plate 3.

Figure 8:
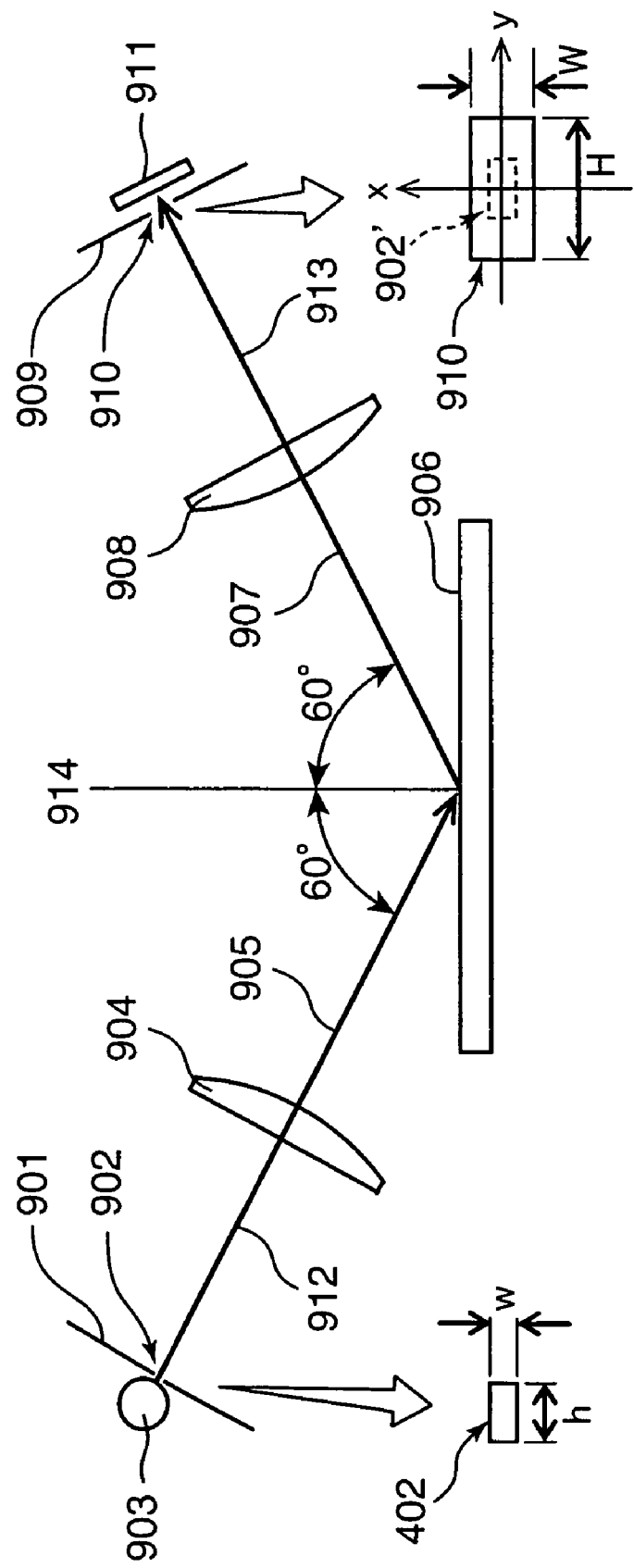
FIG. 8 is a diagram showing a conventional surface profile measuring apparatus.
Figure 9A:
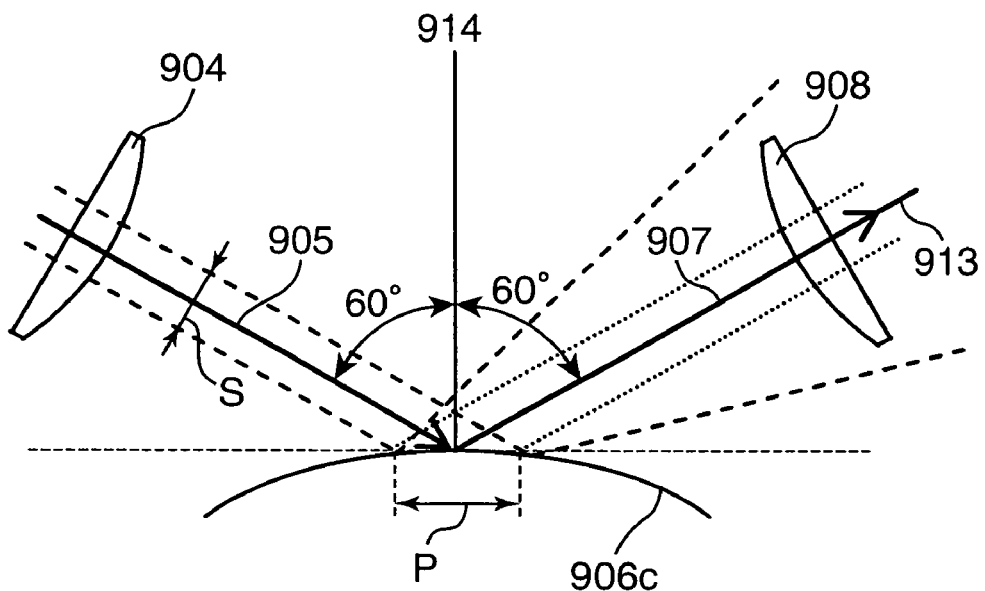
Figure 9B:
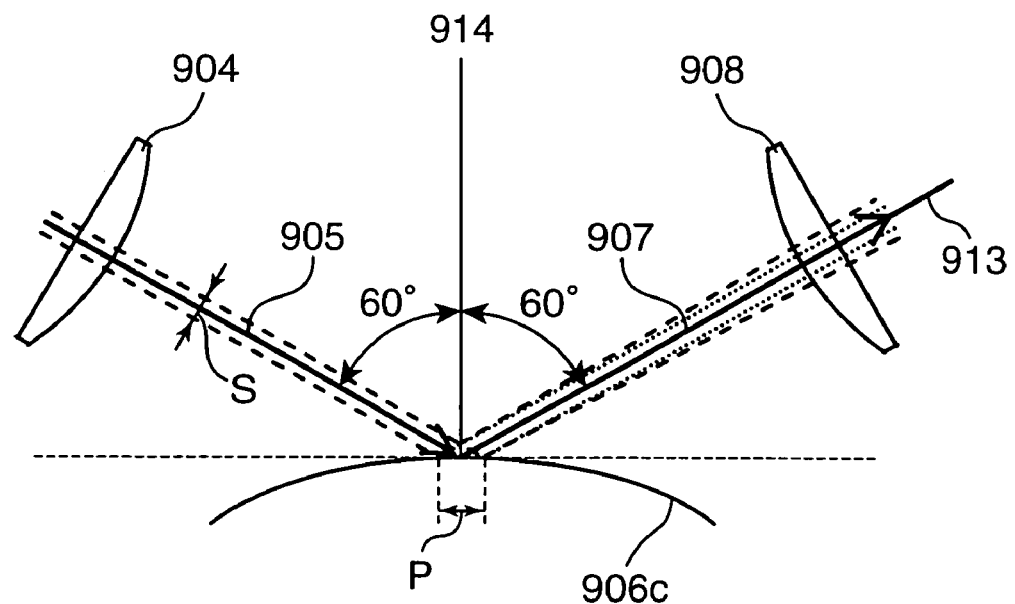
Figure 10A:
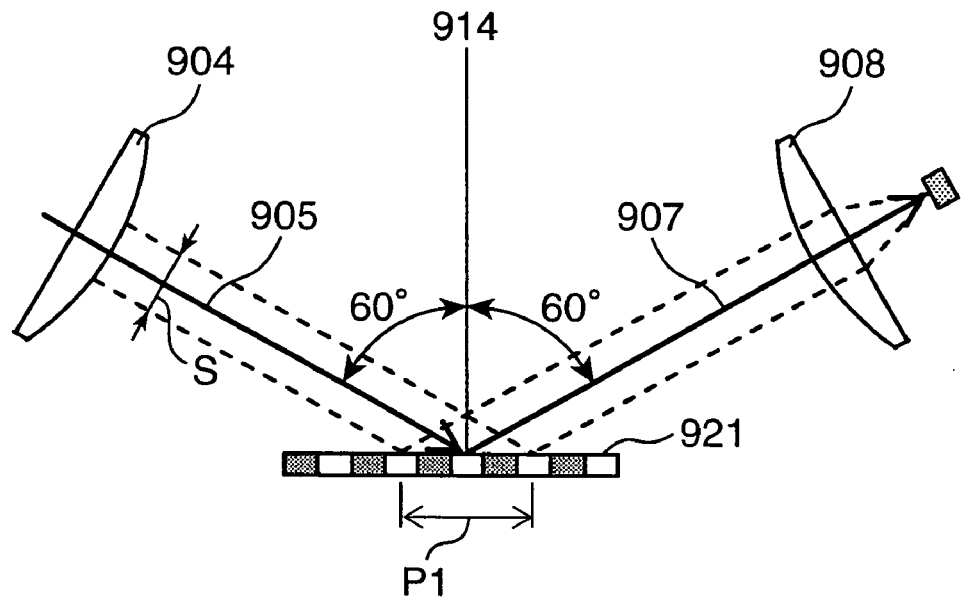
Figure 10B:
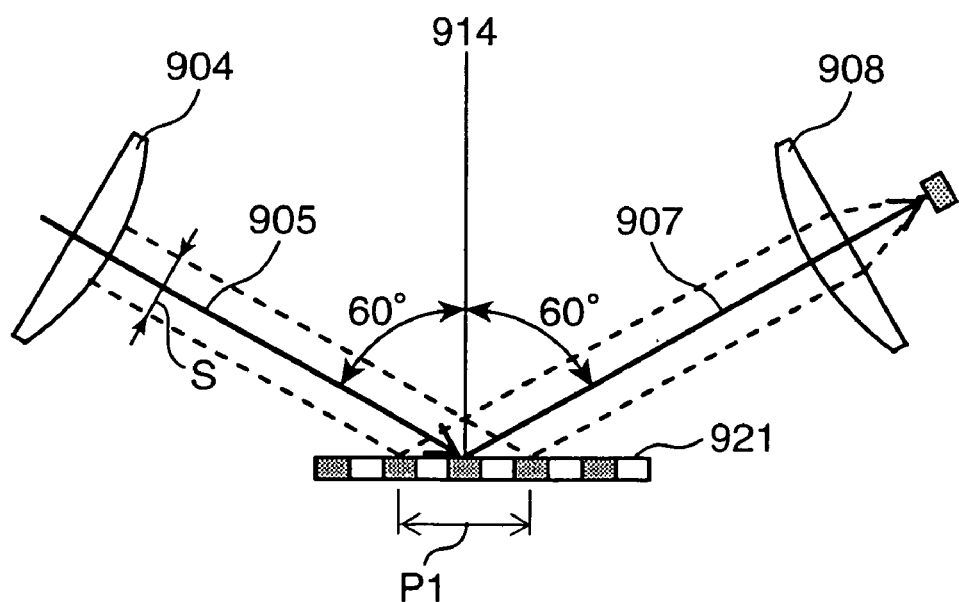
Figure 11A:
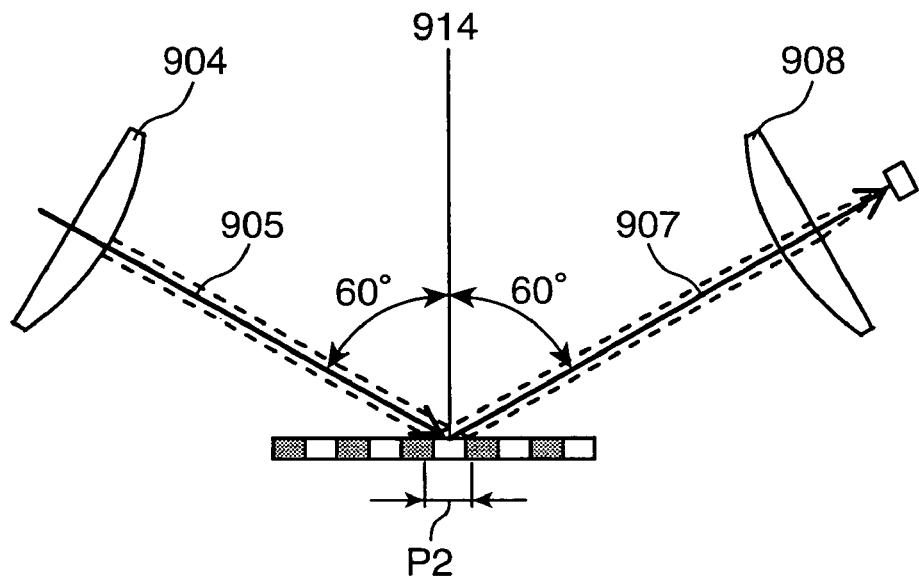
Figure 11B:
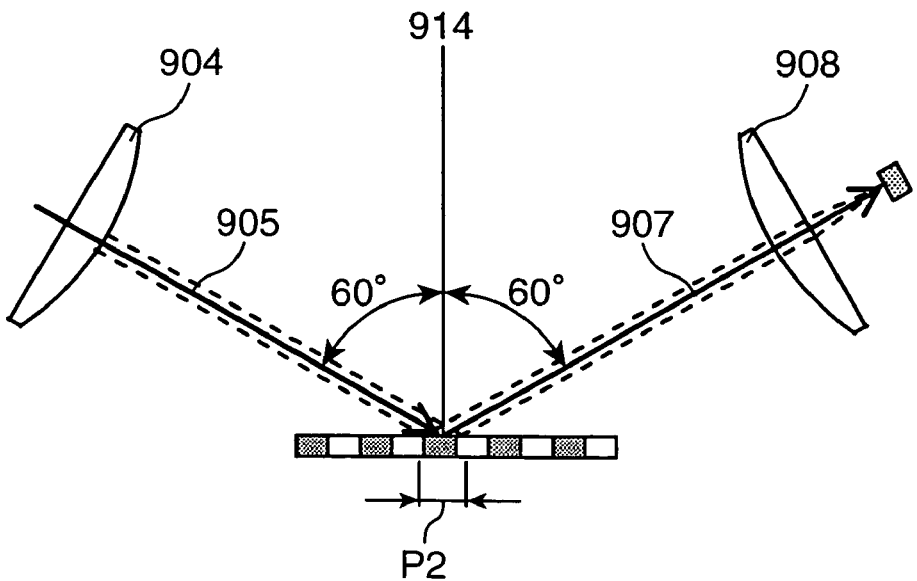

Similarly to the first aperture plate 5, the second aperture plate 8 is a member having an aperture 8a of a predetermined size. The second aperture plate 8 is an aperture diaphragm for defining an angle of the light flux to be incident onto the light receiving device 9 by the aperture area of the aperture 8a. The aperture 8a has a rectangular shape. The second aperture plate 8 is arranged at such a position that the aperture 8a is aligned with a focus position of the light receiving lens 7. By the defining function of the aperture 8a of the second aperture plate 8, a specular reflection component and a vicinity component of the reflection light from the sample surface 10 are incident onto the light receiving device 9. Similarly to the conventional example, the width (w) of the aperture 5a in x-direction parallel to the plane direction of FIG. 8, and the height (h) of the aperture 5a in y-direction orthogonal to the plane direction are respectively e.g. w=0.75 degrees and h=2.5 degrees in terms of angle of view. The width (W) of the aperture 8a in x-direction parallel to the plane direction of FIG. 8, and the height (H) of the aperture 8a in y-direction orthogonal to the plane direction are respectively e.g. W=4.4 degrees and H=11.7 degrees in terms of angle of view.

As shown in FIG. 1, the aperture switching plate 3 has multiple apertures i.e., in the example of FIG. 2, two apertures 3a and 3b of e.g. an elliptical shape having different sizes from each other, for defining the cross sectional size of a light flux or the illumination area to be described later. The aperture switching plate 3 changes the sectional area (hereinafter, called as a "projection light sectional area (S)") of the light flux 2a from the light source 2 for illuminating the sample surface 10, in other words, switches the projection light section area (S) between a large area and a small area by switching between the apertures 3a and 3b. Switching the projection light sectional area (S) or the cross sectional size of the light flux 2a means switching the size or the range of an illumination area (P) on the sample surface 10 to be illuminated with the light flux 2a. In the case where the aperture 3a or the aperture 3b corresponding to an emission light intensity has a circular shape, the cross section of the light flux 2a also has a circular shape. In this case, the cross sectional size of a light flux may also be referred to as an "illumination diameter", in place of the projection light sectional area (S).

Figure 2A:
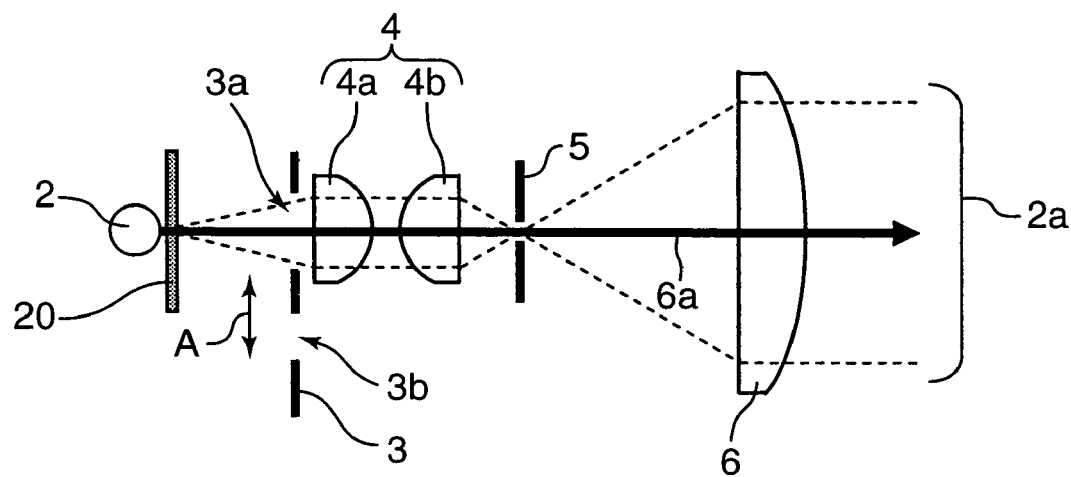
Figure 2B:
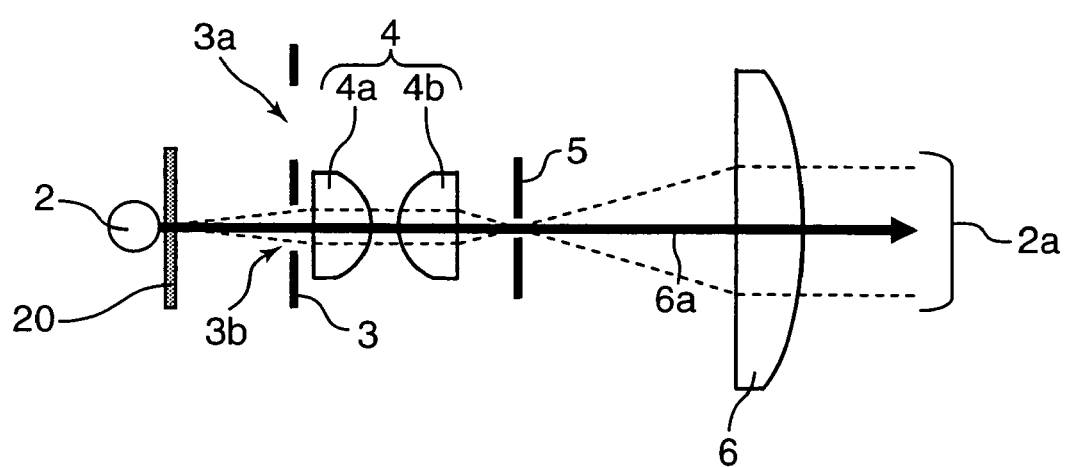

A switching operation between the apertures 3a and 3b to be performed by the aperture switching plate 3 is described referring to FIG. 2. By the switching operation, a condition as shown in e.g. FIG. 2A where the aperture 3a is selected is changed to a condition as shown in FIG. 2B where the aperture 3b is selected. Specifically, the surface profile measuring apparatus 1 has a mechanism for slidably moving the aperture switching plate 3 in the direction shown by the arrows A, in other words, an arrangement, wherein both ends of the aperture switching plate 3 in a vertical direction to the plane of FIGS. 2A and 2B are slidably engaged with a pair of guide rails, respectively, and a user is allowed to grip the aperture switching plate 3 and slidably move the aperture switching plate 3 up and down along the guide rails. In this embodiment, the sliding movement is performed by a manual operation of the user. Alternatively, a sliding driver incorporated with a servo motor or the like may be provided to automatically slide the aperture switching plate 3. The aperture switching plate 3 is slidably moved in such a manner that e.g. a center position of the aperture 3a or 3b is aligned with an optical axis 6a of the illumination lens 6. By switching between the apertures 3a and 3b, the width of the light flux 2a i.e. the projection light sectional area (S) can be changed between the large area and the small area. For instance, if the aperture 3a is switched to the aperture 3b, the light flux 2a is defined in such a manner that the width of the light flux 2a shown in FIG. 2A is reduced to the width of the light flux 2a shown in FIG. 2B. As a result, the illumination area (P) is reduced, as compared with the illumination area (P) to be obtained in a condition that the aperture 3a is used. Thus, by switching the projection light sectional area (S) or the illumination diameter of a projection light flux, the size of the illumination area (P) on the sample surface to be irradiated can be changed. As the size of the illumination area (P) is changed, the light amount of light to be incident onto the light receiving device 9 is changed. In other words, assuming that the light amount of light to be emitted from the light source 2 is fixed, the amount of signal to be acquired by the light receiving device 9 is reduced, as the projection light sectional area (S) is reduced.

The apertures 3a and 3b are arranged at conjugated positions corresponding to image forming positions with respect to the sample surface 10 in the optical system constituted of the relay lens unit 4 and the illumination lens 6. Forming an image of the aperture 3a or the aperture 3b on the sample surface 10 in the conjugated relation enables to accurately define the illumination area (P). In other words, changing the size of the illumination area (P) by switching the aperture size between the apertures 3a and 3b can be accurately performed. The aperture 5a of the first aperture plate 5 has a conjugated relation to the aperture 8a of the second aperture plate 8. Also, a diffuser 20 for diffusing light from the light source 2 i.e. suppressing a light distribution non-uniformity of the light source 2 is arranged at a position near the light source 2.

As described above, a light flux from the light source 2 which has passed through the aperture 3a or the aperture 3b of the aperture switching plate 3, the relay lens unit 4, and the aperture 5a of the first aperture plate 5 is converted into a parallel light flux i.e. the light flux 2a by the illumination lens 6, and the light flux 2a is irradiated onto the sample surface 10 in a direction of about 60° i.e. at an incident angle of 60° with respect to a normal 10n to the sample surface 10. Then, the specular reflection component 10a of reflection light from the sample surface 10 is converged on the light receiving lens 7, and the converged light is received on the light receiving device 9 through the aperture 8a of the second aperture plate 8.

Figure 3:
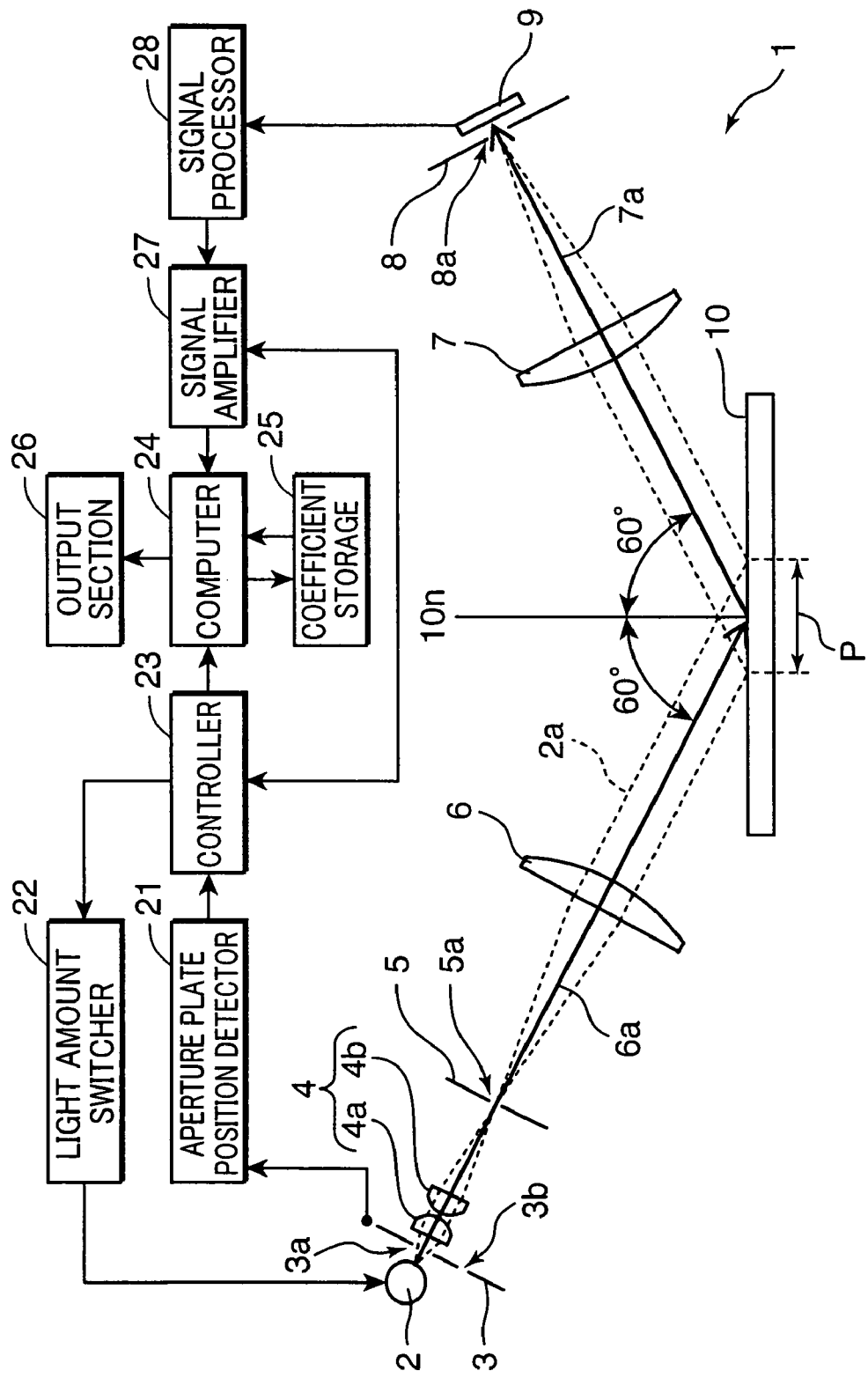
FIG. 3 is a diagram for describing the surface profile measuring apparatus, as an actual apparatus, provided with various functioning parts for performing various computations.

As shown in FIG. 3, the surface profile measuring apparatus 1, as an actual apparatus, includes various functioning parts for performing various computations with respect to an output signal from the light receiving device 9. Specifically, as shown in FIG. 3, the surface profile measuring apparatus 1 includes an aperture plate position detector 21, a light amount switcher 22, a controller 23, a computer 24, a coefficient storage 25, an output section 26, a signal amplifier 27, and a signal processor 28.

The aperture plate position detector 21 detects a sliding position of the aperture switching plate 3, i.e. detects the kind of the aperture as to whether the currently used aperture is the aperture 3a or the aperture 3b. In other words, the aperture plate position detector 21 detects a difference in the projection light sectional area (S) i.e. the size of the illumination area (P). A detection signal from the aperture plate position detector 21 is outputted to the controller 23. The light amount switcher 22 switches an emission light amount i.e. an emission light intensity of the light source 2, based on a light amount switching command signal from the controller 23. The switching of the emission light intensity is performed by e.g. changing a voltage or a current to be applied to the light source 2.

Alternatively, an aperture degree detector for detecting an aperture degree of a diaphragm 30 (see FIGS. 4A and 4B) to be described later may be provided, in place of the aperture plate position detector 21. The aperture degree detector is also adapted to detect a difference in the projection light sectional area (S) i.e. the size of the illumination area (P). Further alternatively, a shift position detector for detecting a shift position of a relay lens unit 50 (see FIGS. 5A and 5B) to be described later, or a shift position detector for detecting a shift position of an aperture plate 40 (see FIGS. 6A and 6B) to be described later may be provided, in place of the aperture plate position detector 21. In the modifications, each of the detectors is also adapted to detect a difference in the projection light sectional area (S) i.e. the size of the illumination area (P).

The controller 23 outputs, to the light amount switcher 22, a light amount switching command signal indicating a light amount of the light source 2 depending on the kind of the aperture i.e. the aperture 3a or 3b, based on a detection signal from the aperture plate position detector 21 or the aperture degree detector or the shift position detector. The controller 23 controls a switching operation of the light amount switcher 22 in such a manner that the light amount is increased i.e. the emission light intensity is increased, as the aperture is switched to a smaller aperture (in this embodiment, the aperture 3b), i.e. as the projection light sectional area (S) or the illumination area (P) is decreased. The controller 23 also outputs, to the computer 24 and the signal amplifier 27, aperture information as to which one of the apertures 3a and 3b is currently used.

The signal processor 28 performs signal processing with respect to an output signal from the light receiving device 9 i.e. converts the output signal into an electrical signal corresponding to the light receiving amount. The output signal which has undergone the processing in the signal processor 28 is outputted to the signal amplifier 27. The signal amplifier 27 amplifies the signal processed by the signal processor 28 with a gain depending on the aperture 3a or 3b, in other words, adjusts the gain. The output signal processed by the signal amplifier 27 is outputted to the computer 24. The signal amplifier 27 stores gain information corresponding to the aperture 3a or 3b. The coefficient storage 25 stores, in advance, processing coefficients i.e. correction coefficients corresponding to the kinds of apertures of the aperture switching plate 3 i.e. corresponding to the apertures 3a and 3b as e.g. an LUT (lookup table).

The computer 24 performs a computation of calculating a glossiness of the sample surface 10, based on output information i.e. the aperture information from the controller 23, the information on the processing coefficients stored in the coefficient storage 25, and signal information from the signal amplifier 27. Specifically, the computer 24 selects and reads out a processing coefficient corresponding to the currently used aperture from the coefficient storage 25, based on the aperture information from the controller 23; and obtains a glossiness value by multiplying the readout processing coefficient by the signal information from the signal amplifier 27. As described above, by performing a computation with use of a processing coefficient depending on the aperture, an influence of error resulting from switching the aperture of the aperture switching plate 3 can be suppressed or eliminated, thereby enabling to accurately calculate a glossiness value with respect to each of the apertures. The above operation corresponds to correcting i.e. calibrating a glossiness value depending on a difference in the aperture. The output section 26 serves as an interface for outputting computation result information by the computer 24 i.e. a glossiness value to an external device.

When the aperture is switched, the light amount of light from the light source 2 to be irradiated onto the sample surface 10 is also changed. As a result, a reflectance of the sample surface 10 is also changed. Assuming that a reflectance of a reference sample surface is 100, and the reflectance 100 is changed to 90 by switching the aperture to the aperture 3b, a processing coefficient i.e. coefficient information for calculating a glossiness value in the case where the reference sample surface has the reflectance 90 is necessary. In other words, if the processing coefficient for use in the case where the reference sample surface has the reflectance 100 is used, an error may be generated, and a precise glossiness value cannot be calculated.

A control flow for measurement to be performed by the surface profile measuring apparatus 1 having the above arrangement is as follows, for instance.

(Control Flow for Measurement)

(1) The current aperture i.e. the aperture 3a or 3b is detected by the aperture plate position detector 21, and a detection signal is outputted to the controller 23.

(2) The controller 23 controls the light source 2 to turn on with the light amount in accordance with the detected aperture 3a or 3b. Basically, the controller 23 controls the light source 2 in such a manner that the light amount is increased, as the projection light sectional area (S) i.e. the illumination area (P) is reduced.

(3) A light flux from the light source 2 is irradiated onto the sample surface 10 via the aperture 3a or 3b, the relay lens unit 4 constituted of the flat convex lenses 4a and 4b, the aperture 5a, and the illumination lens 6 in this order. The irradiated light is reflected as the light flux 10a, and the light flux 10a is incident onto the light receiving device 9 via the light receiving lens 7 and the aperture 8a.

(4) An output signal from the light receiving device 9 is converted into an electrical signal corresponding to the light receiving amount by the signal processor 28, and the electrical signal is outputted to the signal amplifier 27.

(5) An output signal from the signal processor 28 is amplified with a gain corresponding to the aperture 3a or 3b by the signal amplifier 27.

(6) The signal amplified by the signal amplifier 27 is multiplied by a processing coefficient corresponding to the aperture 3a or 3b, in the similar manner as the signal amplification, and a glossiness value is calculated based on the calculation result.

(7) The information on the glossiness value is outputted to an external device e.g. an information processor such as a personal computer (PC) by the output section 26 so that the glossiness value information is subjected to a predetermined processing. Alternatively, the glossiness value information may be displayed on a display section provided in the surface profile measuring apparatus 1.

As described above, in the surface profile measuring apparatus 1, a difference in the projection light sectional area (S) or the illumination area (P) is detected by the aperture plate position detector 21 or the aperture degree detector or the shift position detector, and that the emission light intensity i.e. the light amount of the light source 2 in the projection light optical system is changed i.e. adjusted depending on the difference in the projection light sectional area (S) in the detection information. Alternatively, the surface profile measuring apparatus 1 may have an arrangement for adjusting the light amount in the light receiving optical system. Specifically, the controller 23 may control an exposure condition of the light receiving device 9 depending on a difference in the projection light sectional area (S) i.e. control an exposure time (i.e. an integration time or a measurement time) or a sensitivity of the light receiving device 9. Further alternatively, the surface profile measuring apparatus 1 may be configured in such a manner that the controller 23 changes i.e. adjusts the gain to be applied to the signal amplifier 27 depending on a difference in the projection light sectional area (S). In the modification, as the projection light sectional area (S) is reduced, the exposure time is increased, or the gain is increased. This is because since a reduction in the aperture size limits the light flux i.e. reduces the light amount, it is necessary to increase the light amount by the reduced aperture size.

Figure 4A:
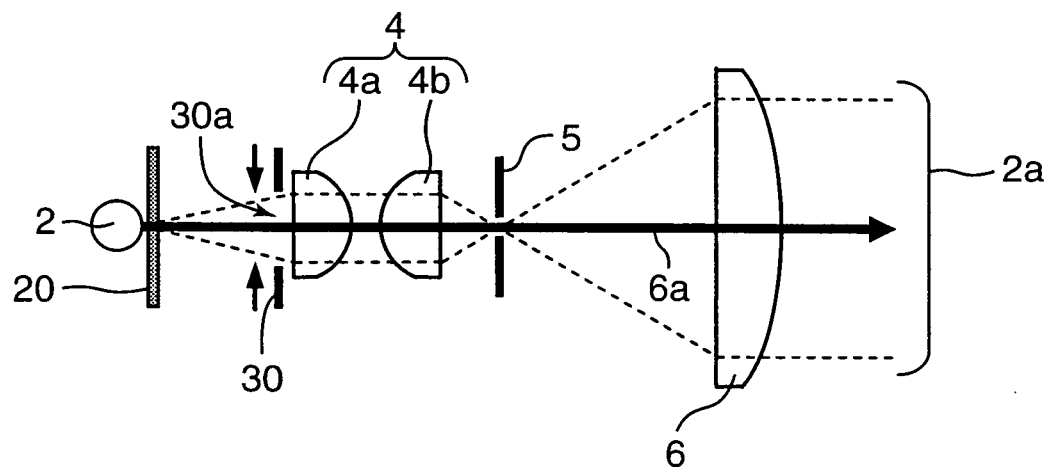
Figure 4B:
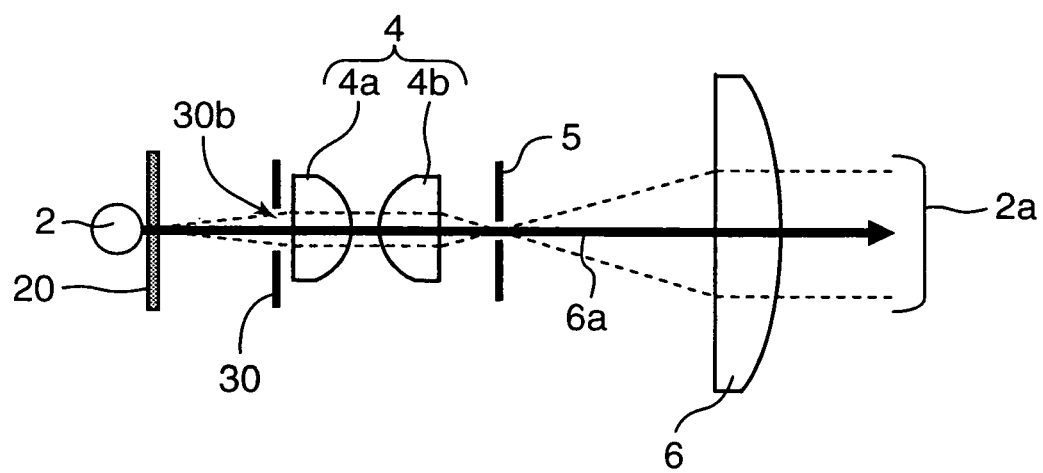

In this embodiment, the projection light sectional area (S) i.e. the size of the illumination area (P) is changed i.e. defined by switching the aperture by shifting the aperture switching plate 3. Alternatively, the diaphragm 30 as a diaphragm mechanism fixedly mounted at the same position as the aperture switching plate 3 may be provided, in place of the aperture switching plate 3 to be shifted. The diaphragm 30 is constructed in such a manner that the aperture size is sequentially variable. By changing the aperture size by the diaphragm 30, the aperture is selectively shifted between a condition as shown in FIG. 4A where a first aperture 30a having a large aperture size is defined, and a condition as shown in FIG. 4B where a second aperture 30b having an aperture size smaller than the aperture size of the first aperture 30a is defined. In this embodiment, the diaphragm 30 is a so-called iris diaphragm, wherein one ends of several aperture wings are rotatably engaged with a fixed ring rotatably coupled to a diaphragm ring, and the other ends thereof are rotatably engaged with a rotation ring. For instance, in the case where a user rotates the rotation ring along with the diaphragm ring, the position of each aperture wing is changed, and as a result, the aperture diameter is changed. The first aperture 30a corresponds to a state of the diaphragm 30 at a maximum aperture size, and the second aperture 30b corresponds to a state of the diaphragm 30 at a minimum aperture size. Adjusting the diaphragm 30 as described above enables to obtain a light flux 2a having a large projection light sectional area (S), in the case where the first aperture 30a is defined; and obtain a light flux 2a having a small projection light sectional area (S) i.e. a narrow light flux 2a, in the case where the second aperture 30b is defined.

Alternatively, a lens shifting arrangement for shifting a lens, wherein the projection light sectional area (S) i.e. the size of the illumination area (P) is changed by using e.g. the relay lens unit 50, in place of using the aperture switching plate 3. The relay lens unit 50 is an optical system i.e. a lens group, which is configured to be slidably movable in the direction of the optical axis 6a i.e. in forward and backward directions. Similarly to the relay lens unit 4, the relay lens unit 50 is constituted of e.g. a pair of flat convex lenses 50a and 50b having convex surfaces thereof opposed to each other. Further alternatively, the relay lens unit 4 may be used as the relay lens unit 50.

In the above modification, the mechanism for shifting the relay lens unit 50 includes at least a pair of guide rails extending in the direction of the optical axis 6a, and slidably holding the relay lens unit 50 at an outer perimeter thereof. The relay lens unit 50 is formed with guide grooves along which the relay lens unit 50 is slidably moved in contact with the guide rails. The guide rails are fixed to a main body of the surface profile measuring apparatus 1. In the above arrangement, a user is allowed to grip the relay lens unit 50 and manually slide the relay lens unit 50 along the guide rails. Alternatively, the relay lens unit 50 may be automatically slid along the guide rails with use of a motor or the like.

Further alternatively, a mechanism incorporated with a rack, and a gear including a pinion gear may be used. Specifically, a rack extends around the outer perimeter of the relay lens unit 50 in the direction of the optical axis 6a. A gear such as a rotary knob in mesh with the rack is provided in the main body of the surface profile measuring apparatus 1. The rack and the relay lens unit 50 are shifted by manually or automatically rotating the gear. Further alternatively, a slider mechanism for rotating a female threaded portion along with the relay lens unit 50 by rotating a male threaded portion i.e. a long threaded portion may be provided, in place of the mechanism incorporated with a rack and a gear.

Figure 5A:
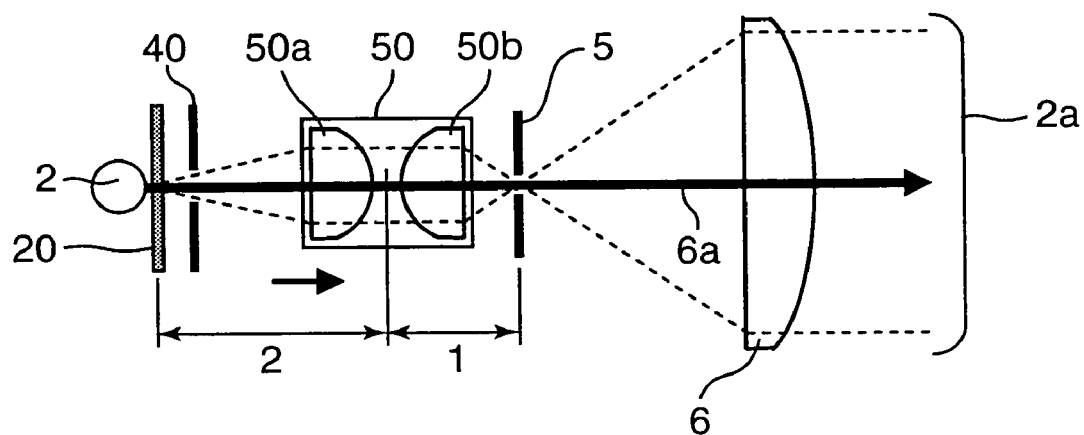
Figure 5B:
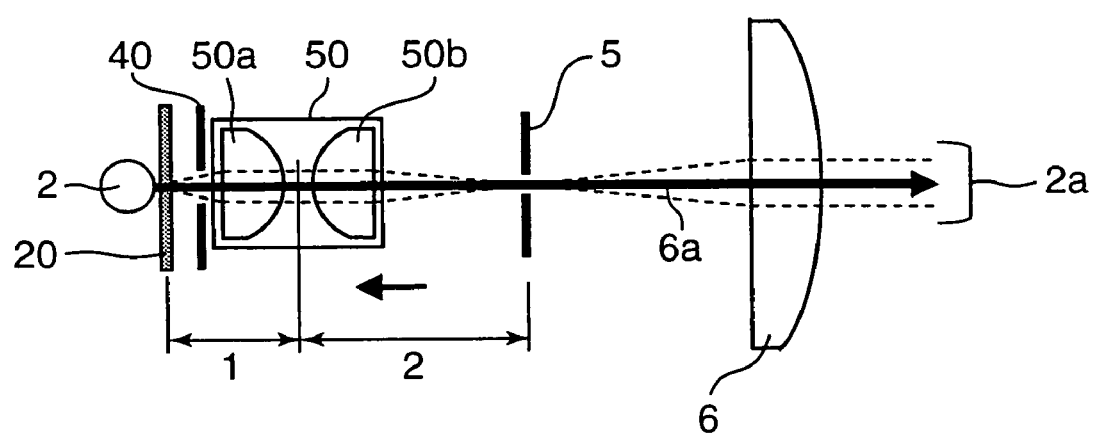

The aperture plate 40 having an aperture 40a of a predetermined size is fixedly mounted on a side of the relay lens unit 50 close to the light source 2. As shown in FIG. 5A, the projection light sectional area (S) of the light flux 2a i.e. the width of the light flux 2a can be increased by shifting the relay lens unit 50 toward the first aperture plate 5. On the other hand, as shown in FIG. 5B, the light to be incident onto the relay lens unit 50 can be limited by shifting the relay lens unit 50 toward the aperture plate 40. Thereby, the projection light sectional area (S) of the light flux 2a i.e. the width of the light flux 2a can be reduced. The relay lens unit 50 is shifted in such a manner that e.g. the center position of the relay lens unit 50 is shifted between two image forming positions having different magnification ratios from each other, in other words, between a position, as shown in FIG. 5A, where the ratio of the focus position of the left-side portion of the relay lens unit 50 to the focus position of the right-side portion of the relay lens unit 50 is set to e.g. 2:1; and a position as shown in FIG. 5B, where the ratio is set to e.g. 1:2.

Figure 6A:
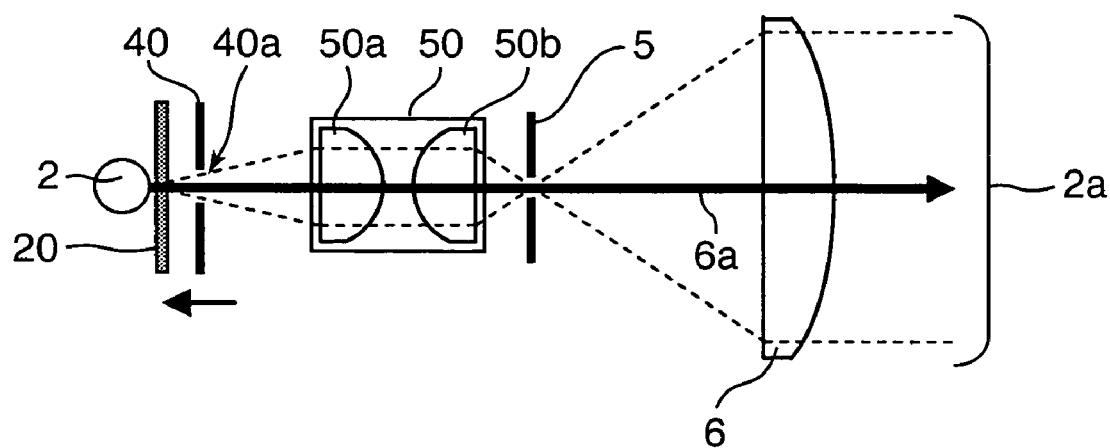
Figure 6B:
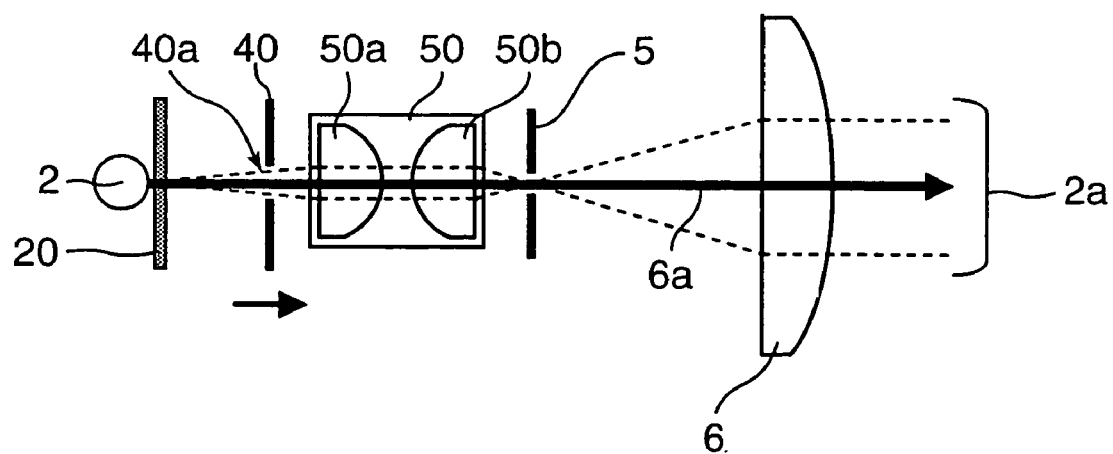

FIGS. 5A and 5B show an arrangement for shifting the relay lens unit 50. Alternatively, it may be possible to use an aperture plate shifting mechanism for slidably shifting the aperture plate 40, while fixing the relay lens unit 50, to change the projection light sectional area (S) i.e. the size of the illumination area (P). In the modification, as shown in FIG. 6A, the projection light sectional area (S) of the light flux 2a can be increased by shifting the aperture plate 40 toward the light source 2 i.e. the diffuser 20 in the direction of the optical axis 6a. On the other hand, as shown in FIG. 6B, the light to be incident onto the relay lens unit 50 can be limited by shifting the aperture plate 40 toward the relay lens unit 50. This enables to reduce the projection light sectional area (S) of the light flux 2a.

In FIGS. 1, 2, and 4, an aperture member (corresponding to the aperture switching plate 3 or the diaphragm 30) for changing the projection light sectional area (i.e. defining a light flux) is aligned with the optical axis between the light source 2 and the relay lens unit 4. Alternatively, as shown in FIG. 7B, the aperture member may be aligned with the optical axis between the illumination lens 6 and the sample surface 10 (in the modification, at a position near the convex surface of the illumination lens 6).

Figure 7A:
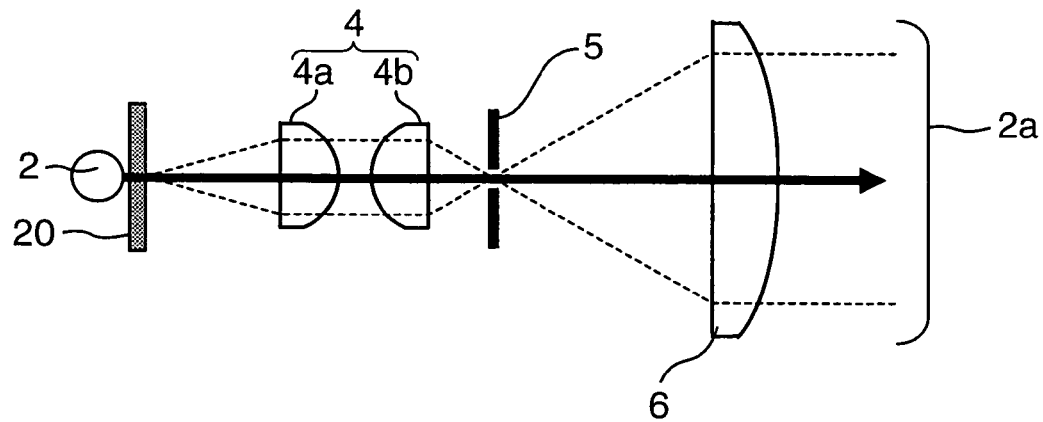
Figure 7B:
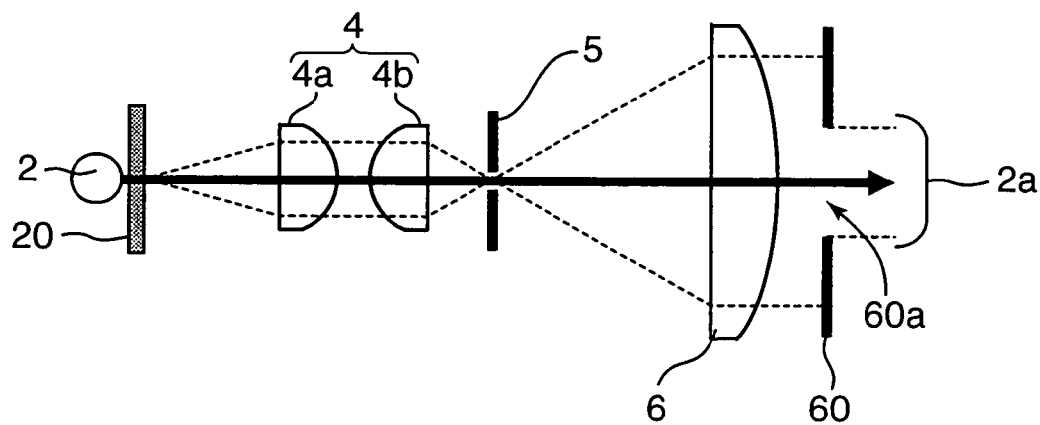

FIG. 7B shows a condition that an aperture plate 60 having an aperture 60a is disposed at the position near the convex surface of the illumination lens 6. FIG. 7A shows a condition that the aperture plate 60 is not disposed, in other words, a condition that a light flux is not defined, or a condition that an aperture plate (not shown) having an aperture of an aperture size larger than the aperture size of the aperture 60a is disposed. In the arrangement shown in FIG. 7B, the size of the illumination area i.e. the illumination diameter can be reduced, as compared with the arrangement shown in FIG. 7A. In the modification, the aperture plate 60 has the single aperture 60a. Further alternatively, the aperture plate may have multiple apertures of aperture sizes different from each other e.g. a large aperture and a small aperture, similarly to the aperture switching plate 3, so that the aperture is switched by slidably moving the aperture plate. Further alternatively, a diaphragm i.e. a diaphragm mechanism may be provided to sequentially change the projection light sectional area.

As described above, the surface profile measuring apparatus 1 in the embodiment includes a light projecting section (corresponding to the light source 2 including the diffuser 20, the relay lens 4, the first aperture plate 5, and the illumination lens 6) for projecting light to be measured onto a sample; a light receiving section (corresponding to the light receiving element 9, which may include the light receiving lens 7 and the second aperture plate 8) for receiving light reflected on the sample surface (corresponding to the sample surface 10); and a changing section (corresponding to the aperture switching plate 3, the relay lens 50, or the aperture plate 40) for changing the cross section (corresponding to the projection light sectional area (S)) of a flux of the light to be projected from the light projecting section.

In the above arrangement, the cross section of the projection light flux with respect to the sample can be changed. Accordingly, in the case where a sample having e.g. a curved surface is measured, light can be projected i.e. irradiated with a small cross section of the projection light flux to prevent reflection light from spreading. In the case where a sample with an uneven surface such as a fine roughness surface is measured, light can be projected with a large cross section of the projection light flux. This enables to easily and precisely measure a surface profile such as a curved surface or a small area of the sample in a short time, without using different kinds of measuring apparatuses (in other words, with use of a single apparatus), and without measuring multiple positions of the sample and performing an averaging process.

In the above arrangement, preferably, the changing section may include an aperture switching plate (corresponding to the aperture switching plate 3) having at least two aperture members (e.g. the apertures 3a and 3b) of aperture sizes different from each other. The aperture switching plate is movable to switch the aperture member through which the projection light flux from the light projecting section is to be transmitted. The changing section is operable to change the cross section of the projection light flux by switching the aperture member.

As described above, the changing section includes the aperture switching plate having at least two aperture members of the aperture sizes different from each other. The aperture switching plate is movable to switch the aperture member through which the projection light flux from the light projecting section is to be transmitted. The changing section is operable to change the cross section of the projection light flux by switching the aperture member. This enables to change the cross section of the projection light flux with a simplified arrangement of using the aperture switching plate having at least two aperture members, and with a simplified manner of switching the aperture member by moving the aperture switching plate.

In the above arrangement, preferably, the changing section may include a diaphragm mechanism (corresponding to the diaphragm 30) having an aperture member (corresponding to the aperture 30a) through which the projection light flux from the light projecting section is to be transmitted. An aperture size of the aperture member is sequentially variable. The diaphragm mechanism may be operable to change the cross section of the projection light flux by changing a degree of opening of the aperture member.

As described above, the changing section includes the diaphragm mechanism having the aperture member through which the projection light flux from the light projecting section is to be transmitted. The aperture size of the aperture member is sequentially variable. The diaphragm mechanism is operable to change the cross section of the projection light flux by changing the opening degree of the aperture member. This enables to change the cross section of the projection light flux with a simplified arrangement of using the diaphragm mechanism, and with a simplified manner of changing the opening degree i.e. the aperture degree.

In the above arrangement, preferably, the aperture member may have a conjugated relation with respect to a position on the sample surface where the projection light flux is projected.

As described above, the aperture member (corresponding to the aperture members of the aperture switching plate, or the aperture member of the diaphragm mechanism) has the conjugated relation with respect to the position on the sample surface where the projection light flux is projected. This enables to accurately change the size of the light projection area (i.e. the illumination area) by switching the aperture member (i.e. changing the aperture size).

In the above arrangement, preferably, the light projecting section may include: a light source (corresponding to the light source 2); a relay lens (corresponding to the relay lens unit 4) for transmitting an emission light flux to be emitted from the light source; a defining aperture plate (corresponding to a first aperture plate 5) for transmitting light condensed on the relay lens to define an angle of the condensed light; an illumination lens (corresponding to the illumination lens 6) for converting the light from the defining aperture plate into a parallel light flux to project the parallel light flux to the sample surface, wherein the aperture member (corresponding to the aperture 3a, 3b, or the aperture 30a) of the aperture switching plate is aligned with an optical axis between the light source and the relay lens.

As described above, the light projecting section includes the light source, the relay lens for transmitting the emission light flux to be emitted from the light source, the defining aperture plate for transmitting the light condensed on the relay lens to define the angle of the condensed light, and the illumination lens for converting the light from the defining aperture plate into the parallel light flux to project the parallel light flux to the sample surface. The aperture member of the aperture switching plate is aligned with the optical axis between the light source and the relay lens. This enables to change the cross section of the projection light flux with a simplified arrangement.

In the above arrangement, preferably, the light projecting section may include: a light source; a first defining aperture plate (corresponding to the aperture plate 40) for defining an emission light flux to be emitted from the light source; a relay lens (corresponding to the relay lens unit 50), as the changing section, for transmitting the emission light flux from the first defining aperture plate; a second defining aperture plate (corresponding to the first aperture plate 5) for transmitting light condensed on the relay lens to define an angle of the condensed light; and an illumination lens (corresponding to the illumination lens 6) for converting the light from the second defining aperture plate into a parallel light flux to project the parallel light flux to the sample surface, wherein the relay lens is movable in a direction of an optical axis of the illumination lens to change the cross section of the projection light flux (see FIGS. 5A and 5B).

As described above, the light projecting section includes the light source, the first defining aperture plate for defining the emission light flux to be emitted from the light source; the relay lens, as the changing section, for transmitting the emission light flux from the first defining aperture plate; the second defining aperture plate for transmitting the light condensed on the relay lens to define the angle of the condensed light; and the illumination lens for converting the light from the second defining aperture plate into the parallel light flux to project the parallel light flux to the sample surface. The relay lens is movable in the optical axis direction of the illumination lens changing section to change the cross section of the projection light flux. This enables to change the cross section of the projection light flux with a simplified manner of moving the relay lens in the optical axis direction.

In the above arrangement, preferably, the light projecting section may include: a light source; a relay lens for transmitting an emission light flux to be emitted from the light source; a defining aperture plate for transmitting light condensed on the relay lens to define an angle of the condensed light; and an illumination lens for converting the light from the defining aperture plate into a parallel light flux to project the parallel light flux to the sample surface, wherein the aperture member of the diaphragm mechanism is aligned with an optical axis between the illumination lens and the sample surface (see FIGS. 7A and 7B).

As described above, the light projecting section includes: the light source; the relay lens (corresponding to the relay lens unit 4) for transmitting the emission light flux to be emitted from the light source; the defining aperture plate (corresponding to the first aperture plate 5) for transmitting the light condensed on the relay lens to define the angle of the condensed light; and the illumination lens for converting the light from the defining aperture plate into the parallel light flux to project the parallel light flux to the sample surface. The aperture member (corresponding to the aperture plate 60) of the diaphragm mechanism is aligned with the optical axis between the illumination lens and the sample surface. This enables to change the cross section of the projection light flux (corresponding to the projection light flux 2a) with a simplified arrangement.

In the above arrangement, preferably, the light projecting section may include: a light source; a first defining aperture plate, as the changing section, for defining an emission light flux to be emitted from the light source; a relay lens for transmitting the emission light flux from the first defining aperture plate; a second defining aperture plate for transmitting light condensed on the relay lens to define an angle of the condensed light; and an illumination lens for converting the light from the second defining aperture plate into a parallel light flux to project the parallel light flux to the sample surface, wherein the first defining aperture plate (corresponding to the aperture plate 40) is movable in a direction of an optical axis (corresponding to the optical axis 6a) of the illumination lens to change the cross section of the projection light flux (see FIGS. 6A and 6B).

As described above, the light projecting section includes: the light source; the first defining aperture plate, as the changing section, for defining the emission light flux to be emitted from the light source; the relay lens for transmitting the emission light flux from the first defining aperture plate; the second defining aperture plate for transmitting the light condensed on the relay lens to define the angle of the condensed light; and the illumination lens for converting the light from the second defining aperture plate into the parallel light flux to project the parallel light flux to the sample surface. The first defining aperture plate is movable in the optical axis direction of the illumination lens to change the cross section of the projection light flux. This enables to change the cross section of the projection light flux with a simplified manner of moving the first defining aperture plate in the optical axis direction.

Preferably, the surface profile measuring apparatus may further include a detecting section (corresponding to the aperture plate position detector 21) for detecting a difference in the cross section (corresponding to the projection light sectional area (S)) of the projection light flux; and a light intensity adjusting section (corresponding to the light amount switcher 22) for adjusting an emission light intensity of the light source (corresponding to the light source 2) depending on the cross section difference detected by the detecting section.

As described above, the detecting section detects the cross section difference of the projection light flux, and the light intensity adjusting section adjusts the emission light intensity of the light source depending on the cross section difference detected by the detecting section. This enables to reduce a measurement error resulting from changing the cross section of the projection light flux, which is advantageous in precisely measuring the surface profile of the sample.

Preferably, the surface profile measuring apparatus may further include: a detecting section for detecting a difference in the cross section of the projection light flux; a computing section (corresponding to the computer 24) for calculating a glossiness value of the sample surface based on light receiving information from the light receiving section; and a storing section (corresponding to the coefficient storage 25) for storing a coefficient to be used in calculating the glossiness value, wherein the computing section calculates the glossiness value by using the coefficient depending on the cross section difference detected by the detecting section.

As described above, the detecting section detects the cross section difference of the projection light flux, the computing section calculates the glossiness value of the sample surface based on the light receiving information from the light receiving section, the storing section stores the coefficient to be used in calculating the glossiness value, and the computing section calculates the glossiness value by using the coefficient depending on the cross section difference detected by the detecting section. This enables to reduce a measurement error resulting from changing the cross section of the projection light flux, which is advantageous in precisely calculating the glossiness value.

In the above arrangement, preferably, the light receiving section may be a light receiving sensor (corresponding to the light receiving device 9), and the surface profile measuring apparatus may further include a detecting section for detecting a difference in the cross section of the projection light flux, and a gain adjusting section (corresponding to the controller 23 or the signal amplifier 27) for adjusting a gain of a light receiving signal from the light receiving sensor depending on the cross section difference detected by the detecting section.

As described above, the light receiving section is the light receiving sensor, the detecting section detects the cross section difference of the projection light flux, and the gain adjusting section adjusts the gain of the light receiving signal from the light receiving sensor depending on the cross section difference detected by the detecting section. This enables to reduce a measurement error resulting from changing the cross section of the projection light flux by adjusting the gain, which is advantageous in precisely measuring the surface profile of the sample.

In the above arrangement, preferably, the light receiving section may be a light receiving sensor, and the surface profile measuring apparatus may further include a detecting section for detecting a difference in the cross section of the projection light flux, and an exposure adjusting section (corresponding to the controller 23) for adjusting an exposure condition of the light receiving sensor depending on the cross section difference detected by the detecting section.

As described above, the light receiving section is the light receiving sensor, the detecting section detects the cross section difference of the projection light flux, and the exposure adjusting section adjusts the exposure condition of the light receiving sensor depending on the cross section difference detected by the detecting section. This enables to reduce a measurement error resulting from changing the cross section of the projection light flux by adjusting the exposure condition of the light receiving sensor, which is advantageous in precisely measuring the surface profile of the sample.

Various arrangements may be additionally provided or modified as far as such additional provision or modification does not depart from the gist of the invention. For instance, the following modifications are applicable.

(A) In the embodiment, the aperture switching plate 3 as shown in FIG. 1 is described an example of a member for switching the aperture. Alternatively, the aperture switching member may be a disc like member i.e. a circular plate like member which has at least two kinds of aperture members formed along a circumferential direction thereof, and is rotatable about an axis thereof. In the modification, the aperture size is changed by rotating the disc like member. As far as the aperture switching member is constructed to switch the aperture between different kinds of apertures having aperture sizes different from each other, any aperture switching member may be used.

(B) For instance, an aperture plate may be arranged near a contact position of the sample surface 10 as shown in FIG. 1 to a measurement aperture member (not shown) of a glossiness meter as an example of the surface profile measuring apparatus, and the aperture may be switched by the aperture plate. Specifically, the size of the projection light flux can be changed by providing a mechanism (corresponding to the above aperture plate) for switching the area (corresponding to the area indicated by the symbol P, i.e. the light projection area or the illumination area) where the illumination light is projected, between a large area and a small area.

The specification discloses the aforementioned arrangements. The following is a summary of the primary arrangements of the embodiment.

A surface profile measuring apparatus according to an aspect of the invention includes: a light projecting section for projecting light to be measured onto a sample; a light receiving section for receiving light reflected on a surface of the sample; a computing section for performing computation to measure a surface profile of the sample based on an output from the light receiving section; and a changing section for changing a cross section of a flux of the light to be projected from the light projecting section.

In the surface profile measuring apparatus having the above arrangement, the cross section of the projection light flux with respect to the sample can be changed. Accordingly, in the case where a sample having e.g. a curved surface is measured, light can be projected i.e. irradiated with a small cross section of the projection light flux to prevent reflection light from spreading. In the case where a sample with an uneven surface e.g. a fine roughness surface is measured, light can be projected with a large cross section of the projection light flux. This enables to easily and precisely measure a surface profile such as a curved surface or a small area of the sample in a short time, without using different kinds of measuring apparatuses (in other words, with use of a single apparatus), and without measuring multiple positions of the sample and performing an averaging process.

In the surface profile measuring apparatus, preferably, the changing section may include an aperture switching plate having at least two aperture members of aperture sizes different from each other, the aperture switching plate being movable to switch the aperture member through which the projection light flux from the light projecting section is to be transmitted, and the changing section may be operable to change the cross section of the projection light flux by switching the aperture member.

In the above arrangement, the cross section of the projection light flux can be changed with a simplified arrangement of using the aperture switching plate having at least two aperture members, and with a simplified manner of switching the aperture member by moving the aperture switching plate.

In the surface profile measuring apparatus, preferably, the changing section may include a diaphragm mechanism having an aperture member through which the projection light flux from the light projecting section is to be transmitted, an aperture size of the aperture member being sequentially variable, and the diaphragm mechanism may be operable to change the cross section of the projection light flux by changing a degree of opening of the aperture member.

In the above arrangement, the cross section of the projection light flux can be changed with a simplified arrangement of using the diaphragm mechanism, and with a simplified manner of changing the opening degree i.e. the aperture degree.

In the surface profile measuring apparatus, preferably, the aperture member may have a conjugated relation with respect to a position on the sample surface where the projection light flux is projected.

In the above arrangement, the aperture member (corresponding to the aperture members of the aperture switching plate, or the aperture member of the diaphragm mechanism) has the conjugated relation with respect to the position on the sample surface where the projection light flux is projected. This enables to accurately change the size of the light projection area (i.e. the illumination area) by switching the aperture member (i.e. changing the aperture size).

In the surface profile measuring apparatus, preferably, the light projecting section may include: a light source; a relay lens for transmitting an emission light flux to be emitted from the light source; a defining aperture plate for transmitting light condensed on the relay lens to define an angle of the condensed light; and an illumination lens for converting the light from the defining aperture plate into a parallel light flux to project the parallel light flux to the sample surface, wherein the aperture member of the aperture switching plate is aligned with an optical axis between the light source and the relay lens.

In the above arrangement, the cross section of the projection light flux can be changed with a simplified arrangement.

In the surface profile measuring apparatus, preferably, the light projecting section may include: a light source; a first defining aperture plate for defining an emission light flux to be emitted from the light source; a relay lens, as the changing section, for transmitting the emission light flux from the first defining aperture plate; a second defining aperture plate for transmitting light condensed on the relay lens to define an angle of the condensed light; and an illumination lens for converting the light from the second defining aperture plate into a parallel light flux to project the parallel light flux to the sample surface, wherein the relay lens is movable in a direction of an optical axis of the light projecting section to change the cross section of the projection light flux.

In the above arrangement, the cross section of the projection light flux can be changed with a simplified manner of moving the relay lens in the optical axis direction.

In the surface profile measuring apparatus, preferably, the light projecting section may include: a light source; a relay lens for transmitting an emission light flux to be emitted from the light source; a defining aperture plate for transmitting light condensed on the relay lens to define an angle of the condensed light; and an illumination lens for converting the light from the defining aperture plate into a parallel light flux to project the parallel light flux to the sample surface, wherein the aperture member of the diaphragm mechanism is aligned with an optical axis between the illumination lens and the sample surface.

In the above arrangement, the cross section of the projection light flux can be changed with a simplified arrangement.

In the surface profile measuring apparatus, preferably, the light projecting section may include: a light source; a first defining aperture plate, as the changing section, for defining an emission light flux to be emitted from the light source, a relay lens for transmitting the emission light flux from the first defining aperture plate; a second defining aperture plate for transmitting light condensed on the relay lens to define an angle of the condensed light; and an illumination lens for converting the light from the second defining aperture plate into a parallel light flux to project the parallel light flux to the sample surface, wherein the first defining aperture plate is movable in a direction of an optical axis of the light projecting section to change the cross section of the projection light flux.

In the above arrangement, the cross section of the projection light flux can be changed with a simplified manner of moving the first defining aperture plate in the optical axis direction.

Preferably, the surface profile measuring apparatus may further include a detecting section for detecting a difference in the cross section of the projection light flux, wherein the light projecting section includes a light source, and an adjusting section for adjusting an emission light intensity of the light source, and the adjusting section adjusts the emission light intensity of the light source depending on the cross section difference detected by the detecting section.

The above arrangement enables to reduce a measurement error resulting from changing the cross section of the projection light flux, which is advantageous in precisely measuring the surface profile of the sample.

Preferably, the surface profile measuring apparatus may further include: a detecting section for detecting a difference in the cross section of the projection light flux; a computing section for calculating a glossiness value of the sample surface based on light receiving information from the light receiving section; and a storing section for storing a coefficient to be used in calculating the glossiness value, wherein the computing section calculates the glossiness value by using the coefficient depending on the cross section difference detected by the detecting section.

The above arrangement enables to reduce a measurement error resulting from changing the cross section of the projection light flux, which is advantageous in precisely calculating the glossiness value.

In the surface profile measuring apparatus, preferably, the light receiving section may be a light receiving sensor, and the surface profile measuring apparatus may further include a detecting section for detecting a difference in the cross section of the projection light flux, and a gain adjusting section for adjusting a gain of a light receiving signal from the light receiving sensor depending on the cross section difference detected by the detecting section.

The above arrangement enables to reduce a measurement error resulting from changing the cross section of the projection light flux by adjusting the gain, which is advantageous in precisely measuring the surface profile of the sample.

In the surface profile measuring apparatus, preferably, the light receiving section may be a light receiving sensor, and the surface profile measuring apparatus may further include a detecting section for detecting a difference in the cross section of the projection light flux, and an exposure adjusting section for adjusting an exposure condition of the light receiving sensor depending on the cross section difference detected by the detecting section.

The above arrangement enables to reduce a measurement error resulting from changing the cross section of the projection light flux by adjusting the exposure condition of the light receiving sensor, which is advantageous in precisely measuring the surface profile of the sample.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:
1. A surface profile measuring apparatus, comprising:
a light projecting section for projecting light onto a surface of a sample;
a light receiving section for receiving light reflected from the surface of the sample;
an aperture switching section configured to select an aperture having a predetermined cross-sectional area and causing the projected light to pass through the aperture prior to being projected onto the surface of the sample;

the aperture switching section configured to select an aperture of reduced size when the sample is curved, wherein the reduced aperture size causes a reduction in a cross-sectional area of light projected onto the surface of the sample so as to reduce divergence of the light reflected from the surface;

the aperture switching section configured to select an aperture of increased sized when the sample has an uneven or fine surface roughness, wherein the increased aperture size causes an increase in a cross-sectional area of light projected onto the surface of the sample so as to reduce variations in the light reflected from the surface; and a computing section configured to measure a surface profile of the sample based on an output from the light receiving section and based on the aperture selected by the aperture switching section.

2. The surface profile measuring apparatus according to claim 1, wherein the aperture switching section controls an aperture switching plate having at least two aperture members of aperture sizes different from each other, the aperture switching plate being movable to switch the aperture member through which the projection light flux from the light projecting section is to be transmitted, and the aperture switching section is operable to change a cross sectional area of the projection light by switching the aperture member.

3. The surface profile measuring apparatus according to claim 2, wherein the aperture member has a conjugated relation with respect to a position on the sample surface where the light is projected.

4. The surface profile measuring apparatus according to claim 2, wherein the light projecting section includes:
a light source;
a relay lens for transmitting an emission light flux to be emitted from the light source;
a defining aperture plate for transmitting light condensed on the relay lens to define an angle of the condensed light; and
an illumination lens for converting the light from the defining aperture plate into a parallel light flux to project the parallel light flux to the sample surface, wherein the aperture member of the aperture switching plate is aligned with an optical axis between the light source and the relay lens.

5. The surface profile measuring apparatus according to claim 2, wherein the light projecting section includes:
a light source;
a relay lens for transmitting an emission light flux to be emitted from the light source;
a defining aperture plate for transmitting light condensed on the relay lens to define an angle of the condensed light; and
an illumination lens for converting the light from the defining aperture plate into a parallel light flux to project the parallel light flux to the sample surface, wherein the aperture member of the aperture switching plate is aligned with an optical axis between the illumination lens and the sample surface.

6. The surface profile measuring apparatus according to claim 1, wherein the aperture switching section controls a diaphragm mechanism having an aperture member through which the projected light is transmitted, an aperture size of the aperture member being sequentially variable, and the diaphragm mechanism is operable to change a cross sectional area of light projected on the surface of the sample by changing a degree of opening of the aperture member.

7. The surface profile measuring apparatus according to claim 6, wherein the aperture member has a conjugated relation with respect to a position on the sample surface where the projection light flux is projected.

8. The surface profile measuring apparatus according to claim 6, wherein the light projecting section includes:
a light source;
a relay lens for transmitting an emission light flux to be emitted from the light source;
a defining aperture plate for transmitting light condensed on the relay lens to define an angle of the condensed light; and
an illumination lens for converting the light from the defining aperture plate into a parallel light flux to project the parallel light flux to the sample surface, wherein the aperture member of the diaphragm mechanism is aligned with an optical axis between the light source and the relay lens.

9. The surface profile measuring apparatus according to claim 6, wherein the light projecting section includes:
a light source;
a relay lens for transmitting an emission light flux to be emitted from the light source;
a defining aperture plate for transmitting light condensed on the relay lens to define an angle of the condensed light; and
an illumination lens for converting the light from the defining aperture plate into a parallel light flux to project the parallel light flux to the sample surface, wherein the aperture member of the diaphragm mechanism is aligned with an optical axis between the illumination lens and the sample surface.

10. The surface profile measuring apparatus according to claim 1, wherein the light projecting section includes:
a light source;
a first defining aperture plate for defining an emission light flux to be emitted from the light source;
a relay lens, as the aperture switching section, for transmitting the emission light flux from the first defining aperture plate;
a second defining aperture plate for transmitting light condensed on the relay lens to define an angle of the condensed light; and
an illumination lens for converting the light from the second defining aperture plate into a parallel light flux to project the parallel light flux to the sample surface, wherein the relay lens is movable in a direction of an optical axis of the light projecting section to change the cross section of the projection light flux.

11. The surface profile measuring apparatus according to claim 1, wherein the light projecting section includes:
a light source;
a first defining aperture plate, as the aperture switching section, for defining an emission light flux to be emitted from the light source, a relay lens for transmitting the emission light flux from the first defining aperture plate;
a second defining aperture plate for transmitting light condensed on the relay lens to define an angle of the condensed light; and
an illumination lens for converting the light from the second defining aperture plate into a parallel light flux to project the parallel light flux to the sample surface, wherein the first defining aperture plate is movable in a direction of an optical axis of the light projecting section to change the cross section of the projection light flux.

12. The surface profile measuring apparatus according to claim 1, further comprising:

a detecting section for detecting a change in the selected aperture, the selected aperture corresponding to a predetermined cross sectional area of the light projected onto the surface of the sample;

wherein the light projecting section includes a light source and an adjusting section for adjusting an emission light intensity of the light source; and wherein the adjusting section adjusts the emission light intensity of the light source depending on the selected aperture.

13. The surface profile measuring apparatus according to claim 1, further comprising:

a detecting section for detecting a change in an intensity level of light flux corresponding to the cross sectional area of the projected light;

a computing section for calculating a glossiness value of the sample surface based on light receiving information from the light receiving section; and a storing section for storing a coefficient to be used in calculating the glossiness value, wherein the computing section calculates the glossiness value by using the coefficient depending on the change in the intensity level of light flux corresponding to the cross sectional area of projected light.

14. The surface profile measuring apparatus according to claim 1, wherein the light receiving section is a light receiving sensor, and the surface profile measuring apparatus further includes a detecting section for detecting a change in the intensity level of light flux corresponding to the cross sectional area of the projected light, and a gain adjusting section for adjusting a gain of a light receiving signal from the light receiving sensor depending on the change in the intensity level.

15. The surface profile measuring apparatus according to claim 1, wherein the light receiving section is a light receiving sensor, and the surface profile measuring apparatus further includes a detecting section for detecting a change in the intensity level of light flux corresponding to the cross sectional area of the projected light, and an exposure adjusting section for adjusting an exposure condition of the light receiving sensor depending on the change in the intensity level of the light flux.

* * * * *